Patented May 1, 1951

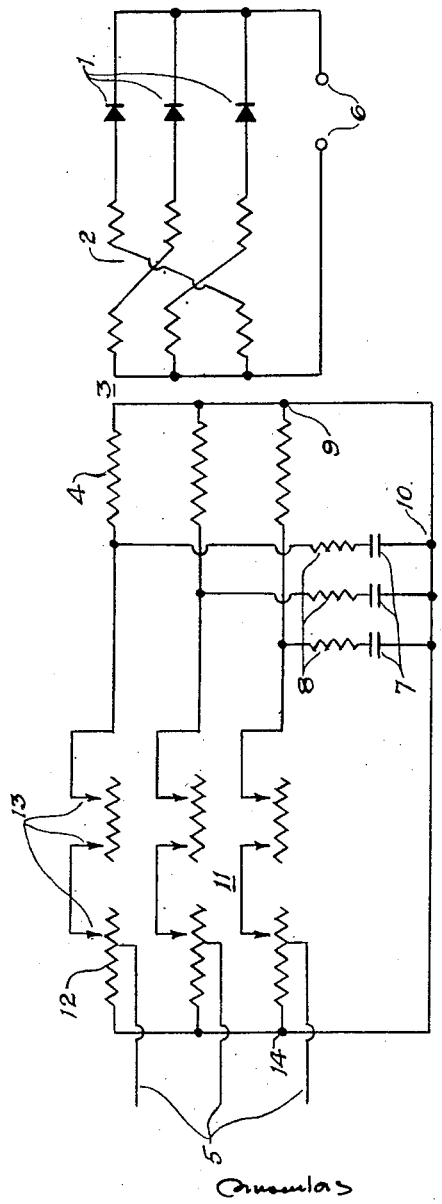

2,550,946

UNITED STATES PATENT OFFICE 2,550,946

SUPPRESSION OF VOLTAGE SURGES TENDING TO ARISE DUE TO THE SWITCHING OF TRANSFORMERS

Sydney Arthur Stevens and Harry Duckitt, King's Cross, London, England, assignors to Westinghouse Brake and Signal Company Limited, London, England Application December 23, 1948, Serial No. 67,054
In Great Britain February 6, 1948

4 Claims. (Cl. 321—8)

It is well known that the switching off of a transformer on no load may give rise to a voltage surge in its windings the magnitude of which depends upon the point on the alternating flux curve at which the switch is opened. The surge will evidently be a maximum if the switching off takes place at the instant when the flux is at a maximum and will be zero if the switching off takes place when the flux is zero.

Surge peak voltages may reach a value many times that of the normal voltage of the load circuit with consequent damage to apparatus connected to the transformer output.

One particular example of a case where such surges are objectionable is that of a low voltage, hight current, rectifier set of the dry surface contact type, fed through a step-down transformer, such as is commonly used in electro-plating sets. In such cases the voltage surge created in the secondary winding of the transformer upon switching off may well damage the rectifier elements.

It has previously been proposed to protect inductive apparatus from switching on surges by connecting a condenser in parallel therewith. While this measure will also guard against the above mentioned voltage surges occurring when the transformer is switched off on no load there is a form of switching which at times causes surges which do not appear to be adequately limited by such a measure. This is the case when a main transformer is connected to an alternating current source through a control, or tap-changing, transformer. It is then found that tap-changing causes large voltage surges across the main transformer windings, even when the conventional condenser is connected in parallel with those windings.

According to the invention these tap-changing surges are suppressed by connecting together the star-point of the main transformer primary windings and the star point of the control transformer secondary windings.

The invention is illustrated, by way of example, in the accompanying drawing, which illustrates, in diagrammatic form, a three phase circuit embodying the invention.

Referring now to the drawings, a rectifier set 1 is supplied with alternating current from the secondary windings 2 of a main transformer 3 and adapted to supply direct current to a load circuit which may be connected across outward terminals 6. Direct current output terminals 6 are connected to the common point of the rectifier units and to the star point of the secondary windings 2 of the transformer 3. The primary windings 4 of transformer 3 are star connected and each has connected across it a surge suppressing condenser 7. Each condenser may have connected in series therewith a resistance 8 for the purpose of damping any oscillatory voltage ripple caused by resonance between the condensers and the inductive reactance of the system.

The primary windings 4 of transformer 3 are connected to a three phase source of alternating current, represented by supply conductors 5, through a control transformer 11, here illustrated as being a three phase auto-transformer with windings 12 and conventional tap-changing gear, represented diagrammatically at 13. The star-point 14 of the control transformer is connected by a conductor 10 to the star-point 9 of the main transformer 3. It is this latter connection between the star-points of the two transformers which substantially eliminates surges caused by tap-changing.

The size of the condensers required will, of course, depend upon the apparatus used and the conditions of use. The following are results obtained from successful tests carried out on a 1000 ampere plating set operating on 400 volts three phase alternating current input to the main transformer and an output voltage of 14.5 volts between lines. The connection of a 1 mfd. condenser across each phase of the star connected primary windings of the main transformer was found adequately to suppress the switch-off surge. Examination of the surge on switching on, with the condensers connected as above, revealed that, due to resonance between the condensers and the inductance of the supply source, a damped oscillatory ripple, with a frequency of about 1500 cycles per second, was produced. A resistance of 100 ohms connected in series with each condenser was found to provide sufficient damping of these oscillations for their effect to be negligible. The control transformer taps for the above tests were at the maximum, so that the main transformer was operating at a high magnetisation. When the transformer taps were changed to the minimum, giving an alternating current output from the main transformer of 3.7 volts, high switch-off surges were again recorded in spite of the condensers and resistances being connected in circuit. A 2 mfd. condenser and a 50 ohm resistance were substituted for those previously used and restored favourable conditions. These values were subsequently found to be suitable for both high and low tappings for the suppression of both switching on and switching off surges, although dangerous surges were still observed when tap changing (switching between control and main transformer) took place. These latter surges were suppressed by joining together the star points of the main transformer primary, the surge absorber circuits and the control transformer, as illustrated in the drawing.

Evidently condensers of larger capacity may be used and the present invention is not limited to the use of any particular size nor to the number of alternating current phases or to the particular transformer connections illustrated in the drawing.

Having thus described our invention, what we claim is:

1. Apparatus for providing a direct current supply from a polyphase source of alternating current comprising, in combination, a first transformer; primary windings having one end connected to a first star point and secondary windings in said transformer; a rectifier connected to said secondary windings; a second transformer connected between said primary windings of said first transformer and a source of alternating current; a secondary circuit associated with said second transformer and having one end thereof connected to a second star point; tap-changing means for adjusting the voltage applied by said second transformer to said first transformer; surge absorbing condensers connected, respectively, across said primary windings of said first transformer; and an electrical connection between said two star points.

2. Apparatus for providing a direct current supply from a polyphase source of alternating current comprising, in combination, a first polyphase transformer having star connected primary windings and star connected secondary windings; rectifiers connected, respectively, to one end of said secondary windings; a star-connected second polyphase auto-transformer connected between said primary windings of said first transformer and a source of polyphase alternating current; a secondary circuit associated with said second transformer; tap-changing means arranged in said secondary circuit of said second transformer for adjusting the voltage applied by said second transformer to said first transformer; surge absorbing condensers connected, respectively, across said primary windings of said first transformer; and an electrical connection between the star points of said primary windings of said first transformer and said second transformer.

3. Apparatus for providing a direct current supply from a polyphase source of alternating current comprising, in combination, a first polyphase transformer having star connected primary windings and star connected secondary windings; rectifiers connected, respectively, to one end of said secondary windings; a star-connected second polyphase auto-transformer connected between said primary windings of said first transformer and a source of polyphase alternating current; a secondary circuit associated with said second transformer; tap-changing means arranged in said secondary circuit of said second transformer for adjusting the voltage applied by said second transformer to said first transformer; surge absorbing condensers connected, respectively, across said primary windings of said first transformer; resistances connected respectively, in series to said condensers; and an electrical connection between the star points of said primary windings of said first transformer and said second transformer.

4. Apparatus for providing a direct current supply from a polyphase source of alternating current comprising, in combination, a first polyphase transformer having star connected primary windings and star connected secondary windings; rectifiers connected, respectively, to one end of said secondary windings; a star-connected second polyphase auto-transformer connected between said primary windings of said first transformer and a source of polyphase alternating current; a secondary circuit associated with said second transformer; tap-changing means arranged in said secondary circuit of said second transformer for adjusting the voltage applied by said second transformer to said first transformer; surge absorbing condensers connected, respectively, across said primary windings of said first transformer; resistances connected, respectively, in series to said condensers, said condensers being connected to a common star point; and an electrical connection between the star points of said condensers, said primary windings of said first transformer, and said second transformer.

SYDNEY ARTHUR STEVENS.
HARRY DUCKITT.

REFERENCES CITED

The following references are of record in the file of this patent:

UNITED STATES PATENTS

| Number | Name | Date |
|---|---|---|
| 1,718,515 | Alexanderson | June 25, 1929 |
| 1,872,304 | Kraut et al. | Aug. 16, 1932 |
| 2,052,413 | Lord | Aug. 25, 1936 |